(12) United States Patent
Kono

(10) Patent No.: US 12,194,792 B2
(45) Date of Patent: Jan. 14, 2025

(54) MOTORCYCLE TIRE

(71) Applicant: Sumitomo Rubber Industries, Ltd., Kobe (JP)

(72) Inventor: Kyosuke Kono, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 10 days.

(21) Appl. No.: 18/201,966

(22) Filed: May 25, 2023

(65) Prior Publication Data

US 2023/0406040 A1 Dec. 21, 2023

(30) Foreign Application Priority Data

Jun. 15, 2022 (JP) .................................. 2022-096800

(51) Int. Cl.
| | |
|---|---|
| *B60C 9/18* | (2006.01) |
| *B60C 9/20* | (2006.01) |
| *B60C 9/22* | (2006.01) |
| *B60C 9/28* | (2006.01) |
| *B60C 11/00* | (2006.01) |

(52) U.S. Cl.
CPC .............. *B60C 9/20* (2013.01); *B60C 9/1835* (2013.01); *B60C 9/2204* (2013.01); *B60C 11/0083* (2013.01); *B60C 2009/2019* (2013.01); *B60C 2009/2022* (2013.01); *B60C 2200/10* (2013.01)

(58) Field of Classification Search
None
See application file for complete search history.

(56) References Cited

U.S. PATENT DOCUMENTS

| | | | | |
|---|---|---|---|---|
| 3,677,319 | A | * | 7/1972 | Mirtain ................. B60C 9/2009 152/531 |
| 9,956,824 | B2 | | 5/2018 | Jo |
| 2006/0000534 | A1 | | 1/2006 | Matsunaga |
| 2006/0102269 | A1 | * | 5/2006 | Uchida ..................... B60C 9/00 152/565 |

(Continued)

FOREIGN PATENT DOCUMENTS

| | | |
|---|---|---|
| JP | 10-109507 A | 4/1998 |
| JP | 2007-125988 A | 5/2007 |
| JP | 2008-15830 A | 1/2008 |

(Continued)

OTHER PUBLICATIONS

Machine Translation: JP-2009051362-A, Ishiyama M, (Year: 2024).*

(Continued)

*Primary Examiner* — Kendra Ly
(74) *Attorney, Agent, or Firm* — Birch, Stewart, Kolasch & Birch, LLP

(57) ABSTRACT

A motorcycle tire comprises a tread reinforcement including a jointless band ply. The jointless band ply has a developed width Wa of not more than 65% of the developed tread width TWe. The tread portion has a tread profile comprising a crown arc portion having a radius R1 of curvature and a pair of shoulder arc portions having a radius R2 of curvature. The radius R1 is smaller than the radius R2 and smaller than 50% of the maximum tire cross-section width Wt. In a normal state of the tire, the axial ends of the crown arc portion are respectively positioned axially inward of the outer edges of the jointless band ply.

18 Claims, 3 Drawing Sheets

(56) References Cited

U.S. PATENT DOCUMENTS

2007/0113946 A1* 5/2007 Manno .................... B60C 9/185
                                                        152/533
2011/0214792 A1   9/2011 Katayama

FOREIGN PATENT DOCUMENTS

| JP | 2008-162433 A |   | 7/2008 |
|----|---------------|---|--------|
| JP | 2009051362 A  | * | 3/2009 |
| JP | 5327957 B2    |   | 10/2013 |
| JP | 2013216135 A  | * | 10/2013 |
| JP | 6623766 B2    |   | 12/2019 |

OTHER PUBLICATIONS

Machine Translation: JP-2013216135-A, Toguchi K, (Year: 2024).*
Extended European Search Report for European Application No. 23174096, dated Oct. 27, 2023.

\* cited by examiner

MOTORCYCLE TIRE

BACKGROUND OF THE INVENTION

Field of the Invention

The present disclosure relates to a tire for motorcycles.

Background Art

Patent Document 1 below discloses a pneumatic tire for motorcycles provided with a spiral belt having a cord angle of from 0 to 5 degrees with respect to the tire equator. In this tire, the radius of curvature from an end of the spiral belt layer to an end of the tread portion is larger than the radius of curvature from the end of the spiral belt layer to the tire equatorial plane. Such tire is explained as being possible to improve the traction performance when accelerating from deep cornering, and stability when leaning the motorcycle.
Patent Document 1: Japanese Patent No. 5327957

SUMMARY OF THE INVENTION

Problems to be Solved by the Invention

In recent years, in this type of motorcycle tire, it is desired to improve turning performance at the initial stage of leaning of a motorcycle.

The present disclosure was made in view of the above problems, and an object of the present disclosure is to provide a motorcycle tire capable of enhancing turning performance at the initial stage of leaning of a motorcycle.

Means for Solving the Problems

According to the present disclosure, a motorcycle tire comprises a tread portion, a toroidal carcass, and a tread reinforcement disposed radially outside the carcass in the tread portion, wherein
- the tread reinforcement includes a band layer,
- the band layer is composed of a jointless band ply made of a band cord spirally wound at an angle of not more than 5 degrees with respect to the tire circumferential direction,
- the jointless band ply is centered on the tire equator and has a developed width of not more than 65% of a developed tread width,
- the tread portion has a tread profile comprising
- a pair of shoulder arcs portions having a radius R2 of curvature, and
- a crown arc portion having a radius R1 of curvature and extending between the shoulder arcs portions across the tire equator,
- the radius R1 of curvature is less than the radius R2 of curvature,
- the radius R1 of curvature is less than 50% of the tire section width,
- in a normal state of the tire in which the tire is mounted on a regular rim and inflated to a normal tire pressure, axial ends of the crown arc portion are respectively located axially inward of axial edges of the jointless band ply.

Effects of the Invention

By adopting the above configurations, the motorcycle tire of the present disclosure can improve turning performance at the initial stage of leaning of the motorcycle.

DETAILED DESCRIPTION OF THE INVENTION

An embodiment of the present disclosure will now be described in detail in conjunction with accompanying drawings.

Figure 1:
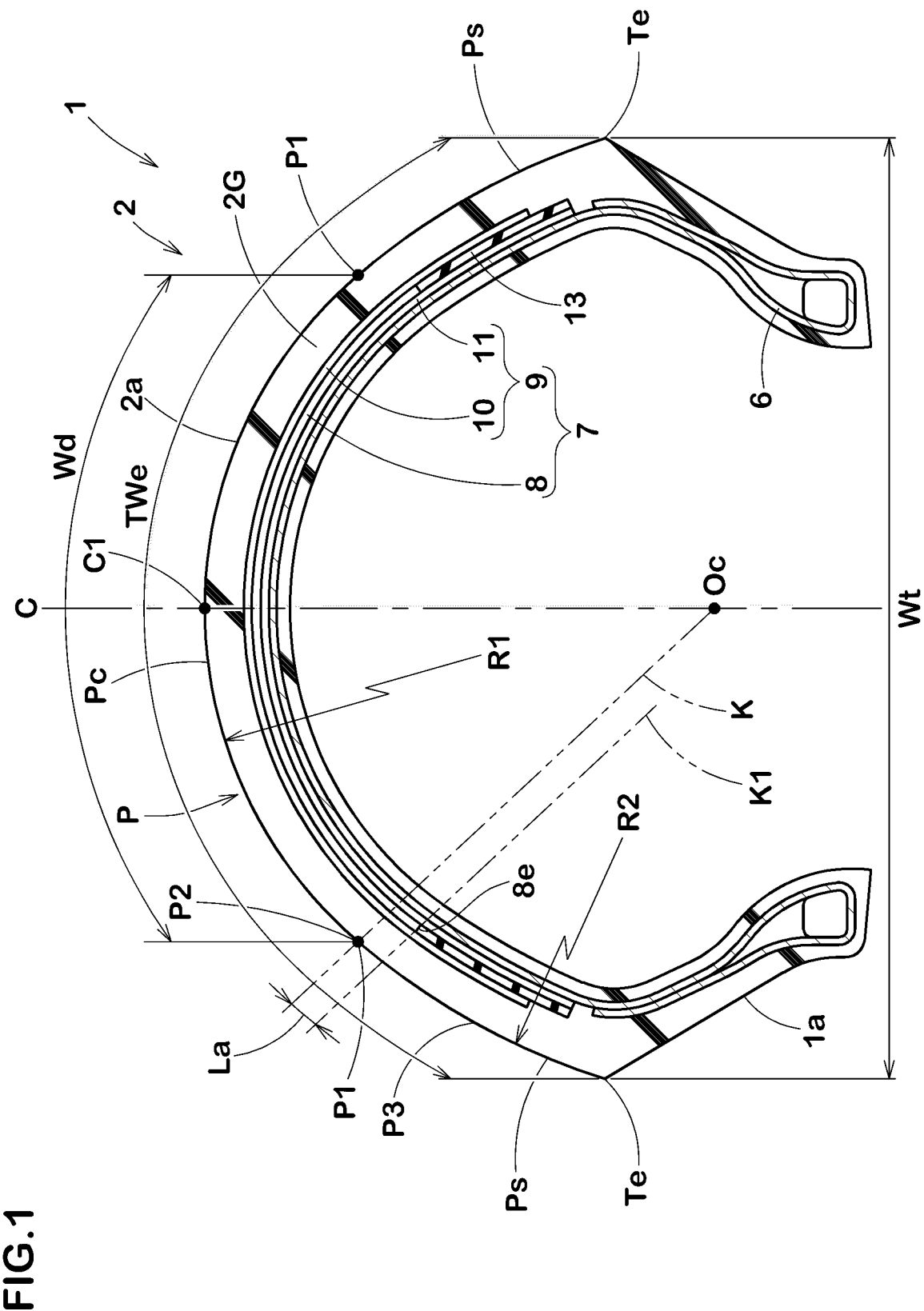
FIG. 1 is a tire meridian cross-sectional view showing a motorcycle tire as an embodiment of the present disclosure.

FIG. 1 is a meridian cross sectional view including a tire rotational axis (not shown), of a motorcycle tire 1 as an embodiment of the present disclosure under its a normal state. The present disclosure is suitably applied to a motorcycle tire used for circuit racing, which is subjected to an increase of the tire outer diameter due to high speed rotation. But, the present disclosure is not limited to such a tire.

The "normal state" of a tire is such a state that the tire is mounted on a regular rim (not shown), and inflated to a normal tire pressure, but loaded with no tire load.

In this application, dimensions, positions and the like relating to the tire refer to those under the normal state, unless otherwise noted.

The "regular rim" is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The "normal tire pressure" and a standard tire load are the maximum air pressure and the maximum tire load for the tire specified by the same organization in the Air-pressure/Maximum-load Table or similar list.

The normal tire pressure is the "maximum air pressure" in JATMA, the "Inflation Pressure" in ETRTO, the maximum pressure given in the "Tire Load Limits at Various Cold Inflation Pressures" table in TRA or the like.

As shown in FIG. 1, the tire 1 of the present embodiment includes a tread portion 2. The radially outer surface of the tread portion 2 forms a tread surface 2a. The tread surface 2a extends between tread edges Te, while relatively largely curving in an arc manner convex toward the outside in the tire radial direction so as to be able to turn with a large camber angle.

The tread edges Te are the axially outermost edges which may contact with the ground when the camber angle is maximized.

In the present embodiment, the maximum cross section width Wt of the tire 1 occurs between the tread edges Te.

The measurement between the tread edges Te along the curved tread surface 2a is the developed tread width TWe.

The tire equator C is located at the axial center between the tread edges Te.

The tire 1 further comprises a toroidal carcass 6, and a tread reinforcement 7 disposed radially outside the carcass 6 in the tread portion 2.

Figure 2:
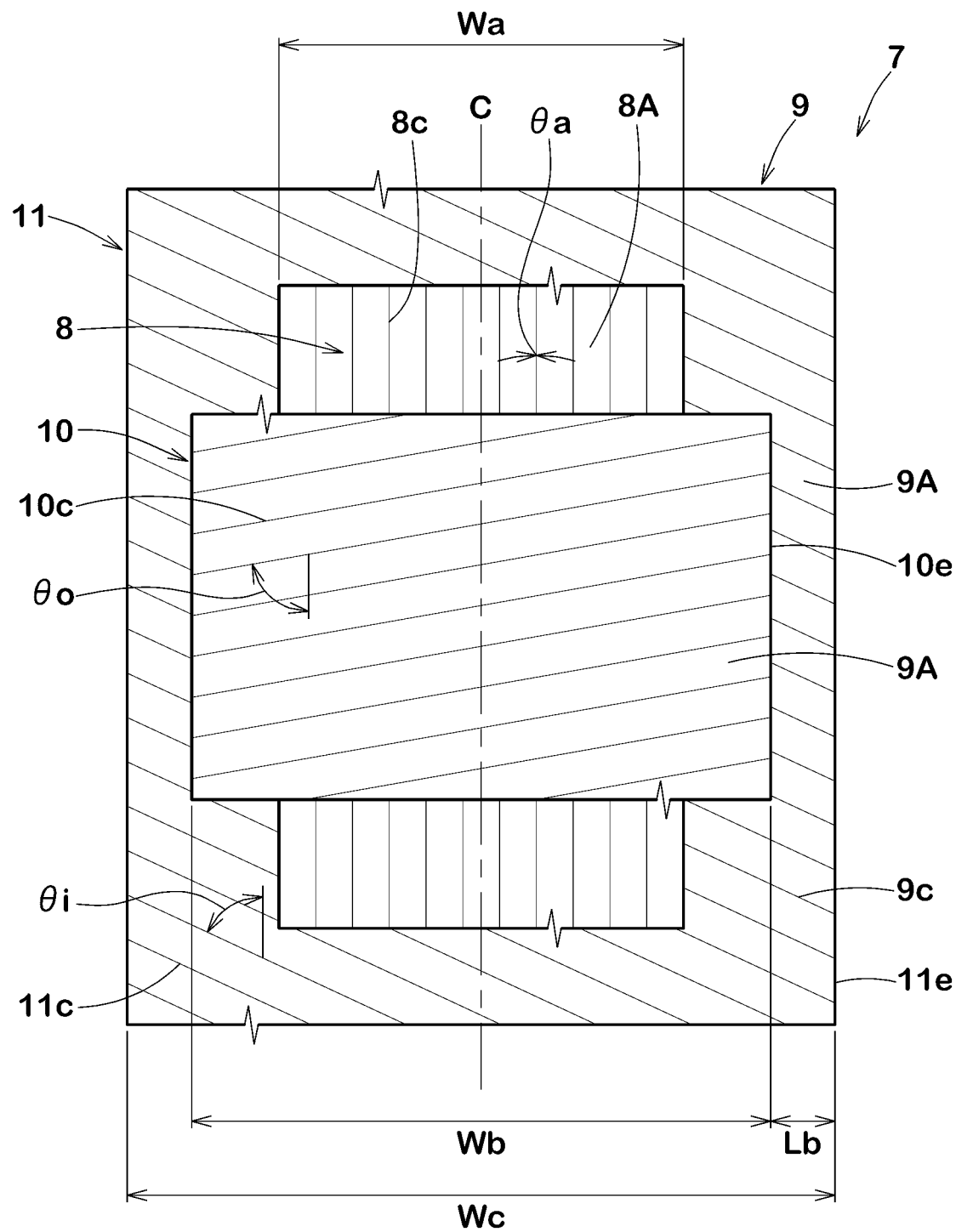
FIG. 2 is a developed view of the tread portion of the tire shown in FIG. 1.

FIG. 2 is a developed view of the tread reinforcement 7. As shown in FIGS. 1 and 2, the tread reinforcement 7 includes a band layer 8.

The band layer 8 is composed of a jointless band ply 8A made of at least one band cord 8c wound spirally and circumferentially of the tire at a cord angle θa of not more than 5 degrees with respect to the tire circumferential direction.

Such band layer 8 suppresses the increase of the outer diameter of the tire at high speed rotations, and can exhibit excellent high-speed stability.

The jointless band ply 8A is centered on the tire equator C and has a developed width Wa of not more than 65% of the developed tread width TWe.

As a result, when the motorcycle is largely tilted, and the ground contact patch shifts to a portion where the jointless band ply 8A is not disposed or almost not disposed, the tire can ensure basic turning performance.

The profile P of the tread surface 2a of the tread portion 2 comprises a crown arc portion Pc having a radius R1 of curvature and extending across the tire equator C, and a pair of shoulder arc portions Ps having a radius R2 of curvature and respectively extending from axial ends P1 of the crown arc portion Pc.

The profile P is the contour of the tread surface 2a in the tire meridian cross section.

The radius R1 of curvature may be defined by the radius of a circle passing through three points which are a first point C1 on the tread profile P at the tire equator C, and two points on the tread profile P at the axial ends P1 of the crown arc portion Pc. The radius R2 of curvature may be defined by the radius of a circle passing through three points on the tread profile P at the tread edge Te, the axially inner end P2 of the shoulder arc portion Ps, and the midpoint P3 of the length between the tread edge Te and the axially inner end P2 along the tread surface 2a.

Incidentally, the axially inner end P2 of the shoulder arc portion Ps coincides with the axial end P1 of the crown arc portion Pc.

The radius R1 is smaller than the radius R2.

The radius R1 is smaller than 50% of the maximum cross section width Wt of the tire. Such crown arc portion Pc can improve the maneuverability, especially lightness at the initial stage of leaning of the motorcycle (hereinafter sometimes simply referred to as the "initial turning performance").

The maximum cross section width Wt is the axial distance at the maximum width positions of the tire.

In the present embodiment, the maximum cross section width Wt is the axial distance between the tread edges Te.

The ratio (R2/R1) between the radius R2 of curvature and the radius R1 of curvature is preferably not less than 1.1, more preferably not less than 1.3, but preferably not more than 3.0, more preferably not more than 2.0.

If the ratio (R2/R1) is less than 1.1, in other words, if the difference between the radius R2 of curvature and the radius R1 of curvature is small, the maneuverability may deteriorate from the initial stage to the final stage of leaning of the motorcycle.

If the ratio (R2/R1) exceeds 3.0, in other words, if the radius R2 of curvature is excessively large, it may become difficult to make smooth handling from the middle to the final stage of leaning of the motorcycle.

Further, if the ratio (R2/R1) exceeds 3.0, for example, when the radius R1 of curvature is excessively small, there is a possibility that the stability during straight running may deteriorate.

Both the axial ends P1 of the crown arc portion Pc are respectively located axially inside the axial edges 8e of the jointless band ply 8A.

In this embodiment, more specifically, the axial edge 8e of the jointless band ply 8A is positioned on the tread edge Te side of a virtual line K drawn between the axial end P1 of the crown arc portion Pc and the center Oc of the radius R1 of curvature on each side of the tire equator C.

As a result, the jointless band ply 8A suppresses the increase of the outer diameter of the tire 1 at high speed rotation occurring at the axial ends P1 of the crown arc portion Pc, and the radius R1 of curvature can be maintained.

Thereby, the initial turning performance is maintained at a high level.

The developed distance La between the axial end P1 of the crown arc portion Pc and the axial edge 8e of the jointless band ply 8A is preferably not less than 2%, more preferably not less than 4%, but preferably not more than 10%, more preferably not more than 8% of the developed tread width TWe.

The developed distance La is the distance measured along the tread surface 2a between the virtual line K and a virtual line K1 drawn parallel to the virtual line K passing through the axial edge 8e.

The radius R1 of curvature of the crown arc portion Pc is preferably not less than 40%, more preferably not less than 45%, but preferably not more than 55% of the maximum cross section width Wt of the tire.

The developed width Wd of the crown arc portion Pc is preferably 30% to 60% of the developed tread width TWe and centered on the tire equator C.

The developed width Wa of the jointless band ply 8A is preferably not less than 30%, more preferably not less than 35% of the developed tread width TWe and centered on the tire equator C. This maintains high stability in straight running.

In order to obtain good initial turning performance, the developed width Wa of the jointless band ply 8A is preferably less than 50%, more preferably less than 45%, of the developed tread width TWe.

The band cord 8c is preferably an organic fiber cord such as nylon fiber, polyester fiber, rayon fiber, polyethylene naphthalate fiber, and aramid fiber.

The tread reinforcement 7 further comprises a belt layer 9.

The belt layer 9 is composed of a plurality of belt plies 9A made of parallel belt cords 9c.

Each of the belt plies 9A has a developed width larger than the developed width Wa of the jointless band ply 8A.

Such belt plies 9A increase the rigidity of the tread portion 2 and helps to generate a large cornering force.

The belt plies 9A include a radially outer belt ply 10 disposed on the radially outer side of the jointless band ply 8A, and a radially inner belt ply 11 disposed on the radially inner side of the jointless band ply 8A.

Thus, in the present embodiment, the jointless band ply 8A is sandwiched between the belt plies 10 and 11, Thereby, the stiffening effect of the cross belt plies 9A is alleviated in the region where the jointless band ply 8A is interposed, so that cornering force is somewhat restrained.

The tread surface 2a on the radially outer side of the jointless band ply 8A is in contact with the ground from straight running to the initial stage of leaning of the motorcycle. At the initial stage of leaning of the motorcycle, the centrifugal force is small. Therefore, the cornering force and the centrifugal force can be balanced at the initial stage of leaning of the motorcycle, so the initial turning performance is improved. The angle θo of the belt cords 10c of the radially outer belt ply 10 with respect to the tire equator C is set to be larger than the angle θi of the belt cords 11c of the radially inner belt ply 11 with respect to the tire equator C.

In general, the belt cords 10c of the radially outer belt ply 10 near the tread surface 2a greatly affect running characteristics.

In the present embodiment, since the angle θo of the belt cords 10c of the radially outer belt ply 10 is relatively large, smooth handling can be achieved during turning.

The difference (θo−θi) between the angles θo and θi is preferably 10 to 40 degrees.

Since the difference (θo−θi) is not less than 10 degrees, the belt layer can exhibit the basic hoop effect.

Since the difference (θo−θi) is not more than 40 degrees, an excessive increase in cornering force is suppressed, and the transient characteristics from the initial-stage to the final-stage, and vice versa, of leaning of the motorcycle are maintained at a high level.

The angle θo is preferably not less than 70 degrees, more preferably not less than degrees, but preferably not more than 90 degrees, more preferably not more than 85 degrees.

When the angle θo is not less than 70 degrees, an excessive hoop effect can be suppressed, a good cornering force can be generated, and turning performance can be improved.

The angle θi is preferably not less than 50 degrees, more preferably not less than degrees, but preferably not more than 80 degrees, more preferably not more than 70 degrees.

When the angle θi is not less than 50 degrees, an excessive hoop effect can be suppressed, a good cornering force can be generated, and turning performance can be improved. When the angle θi is not more than 80 degrees, an angle difference from the belt cords 10c of the radially outer belt ply 10 can be provided, and an effective hoop effect can be exhibited.

It is preferable that the direction of inclination of the belt cords 10c of the radially outer belt ply 10 with respect to the tire equator C is different from the direction of inclination of the belt cords 11c of the radially inner belt ply 11 with respect to the tire equator C. Thereby, an effective hoop effect can be exhibited.

Preferably, the developed width Wb of the radially outer belt ply 10 is 75% to 95% of the developed tread width TWe.

In the present embodiment, the developed width Wb of the radially outer belt ply 10 is smaller than the developed width We of the radially inner belt ply 11.

Preferably, the developed distance Lb between the axial edge 10e of the radially outer belt ply 10 and the axial edge 11e of the radially inner belt ply 11 is 3% to 10% of the developed tread width TWe.

Preferably, the belt cords 9c are organic fiber cords such as nylon fiber, polyester fiber, rayon fiber, polyethylene naphthalate fiber, and aramid fiber.

On both sides in the tire axial direction of the jointless band ply 8A, reinforcing rubber layers 13 are disposed between the radially outer belt ply 10 and the radially inner belt ply 11.

Such reinforcing rubber layers 13 increases the torsional rigidity of the belt layer in the axially outer regions of the jointless band ply 8A.

Thereby, the cornering force increases from the middle-stage to the final-stage of leaning of the motorcycle, and the turning performance is improved.

Figure 3:
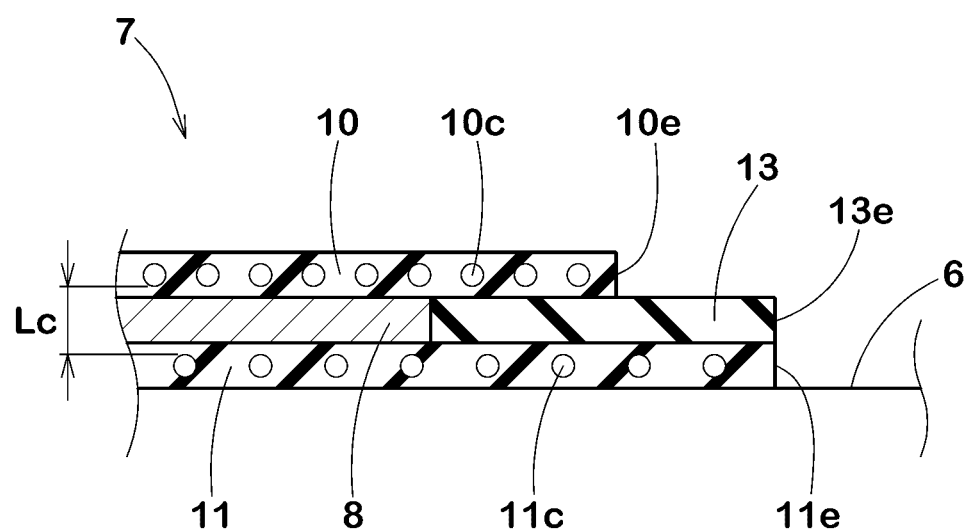
FIG. 3 is a schematic cross-sectional view of a tread reinforcement.

FIG. 3 is a schematic cross-sectional view of an end portion of the tread reinforcement 7.

It is preferable that the minimum distance Lc between the belt cords of the radially outer belt ply 10 and the belt cords of the radially inner belt ply 11 between which the reinforcing rubber layer 13 exists as shown in FIG. 3, is 0.5 to 3 mm.

Since the minimum distance Lc is not less than 0.5 mm, the above effects are effectively exhibited.

Since the minimum distance Lc is not more than 3 mm, excessive increase in cornering force is suppressed, and the transient characteristics from the initial-stage to the final-stage of leaning of the motorcycle is maintained at high levels.

The axially outer edge 13e of the reinforcing rubber layer 13 is positioned axially outside the axial edge 10e of the radially outer belt ply 10.

Therefore, the axial edge 10e of the radially outer belt ply 10 is disposed on the radially outer side of the reinforcing rubber layer 13.

As a result, between the axial edges 10e of the radially outer belt ply 10, the minimum distance Lc is maintained to be 0.5 to 3 mm.

In the present embodiment, although not particularly limited, the axially outer edge 13e of the reinforcing rubber layer 13 coincides with the axial edge 11e of the radially inner belt ply 11.

The complex elastic modulus $E^*1$ of the reinforcing rubber layer 13 is preferably not less than 0.5 MPa, more preferably not less than 0.7 MPa, but preferably not more than 3.0 MPa, more preferably not more than 2.5 MPa.

Since the complex elastic modulus $E^*1$ of the reinforcing rubber layer 13 is not less than 0.5 MPa, the torsional rigidity of the region axially outside the jointless band ply 8A is effectively increased.

Since the complex elastic modulus $E^*1$ of the reinforcing rubber layer 13 is not more than 3.0 MPa, an excessive increase in rigidity in the region axially outside the jointless band ply 8A can be suppressed.

As a result, the transient characteristic from the middle stage to the final stage of leaning of the motorcycle is maintained at high levels.

As shown in FIG. 1, the tread portion 2 further comprises a tread rubber 2G disposed on the radially outer side of the radially outer belt ply 10.

The radially outer surface of the tread rubber 2G forms the tread surface 2a.

It is preferable that the complex elastic modulus $E^*2$ of the tread rubber 2G is larger than the complex elastic modulus $E^*1$ of the reinforcing rubber layer 13.

Such tread rubber 2G can exhibit stability and optimum gripping force during running. The complex elastic modulus $E^*2$ of the tread rubber 2G is preferably not less than 4.0 MPa, more preferably not less than 5.0 MPa, but preferably not more than 8.5 MPa, more preferably not more than 7.0 MPa.

The values of the complex elastic modulus $E^*$ are measured in accordance with Japanese Industrial Standard (JIS) K6394 under the following conditions, using a dynamic viscoelasticity measuring device (Xplexer series) manufactured by GABO.

Initial strain: 10%
Amplitude of dynamic strain: +/−1%
Frequency: 10 Hz
Deformation mode: Tensile
Measurement temperature: 70 degrees C.

While detailed description has been made of a preferable embodiment of the present disclosure, the present disclosure can be embodied in various forms without being limited to the illustrated embodiment.

Comparison Tests

Based on the structure shown in FIG. 1, motorcycle tires were experimentally manufactured as test tires including Working Example tires Ex.1-Ex.10 and Comparative example tires Ref.1-Ref.3. Specifications are shown in TABLE 1.

Each test tire was mounted on the front wheel of a motorcycle. The tire mounted on the rear wheel was common to all.

front tire size: 120/70R17
front tire air pressure: 250 kPa
front tire cross-sectional width Wt: 120 mm
rear tire size: 200/60R17
rear tire air pressure: 290 kPa
Motorcycle: engine displacement 1000cc The motorcycle was run at high speed in a test circuit course, and the test rider evaluated the initial turning performance, middle turning performance, transitional characteristics (smoothness during leaning), and ground contact feeling (stability during leaning the motorcycle).

The results are indicated in TABLE 1 as scores based on the comparative example tire Ref.1 being 10, wherein the larger the number, the better the various performances.

From the test results, it was confirmed that, as compared to the comparative example tires, the working example tires were improved in the initial turning performance.

Statement of the Present Disclosure

The present disclosure is as follows.

Present Disclosure 1

A motorcycle tire comprising: a tread portion, a toroidal carcass, and a tread reinforcement disposed radially outside the carcass in the tread portion,
wherein
the tread reinforcement includes a band layer,
the band layer is composed of a jointless band ply made of a band cord spirally wound at an angle of not more than 5 degrees with respect to the tire circumferential direction,
the jointless band ply is centered on the tire equator and has a developed width of not more than 65% of a developed tread width,
the tread portion has a tread profile comprising
a pair of shoulder arcs portions having a radius R2 of curvature, and
a crown arc portion having a radius R1 of curvature and extending between the shoulder arcs portions across the tire equator,

TABLE 1

| Tire | Ref. 1 | Ref. 2 | Ref. 3 | Ex. 1 | Ex. 2 | Ex. 3 | Ex. 4 |
|---|---|---|---|---|---|---|---|
| Wa/TWe (%) | 67 | 53 | 53 | 53 | 53 | 53 | 47 |
| R1 (mm) | 61 | 61 | 58 | 58 | 58 | 58 | 58 |
| R2 (mm) | 61 | 67 | 55 | 61 | 67 | 67 | 67 |
| R2/R1 | 1.0 | 1.1 | 0.95 | 1.05 | 1.16 | 1.16 | 1.16 |
| La/TWe (%) | 4(*1) | 6.5 | 6.5 | 6.5 | 1.5 | 1.5 | 1.5 |
| Wb/TWe (%) | 93 | 93 | 93 | 93 | 93 | 87 | 87 |
| Wc/TWe (%) | — | — | — | — | — | 97 | 97 |
| θo (deg.) | 90 | 90 | 90 | 90 | 90 | 90 | 90 |
| θi (deg.) | — | — | — | — | — | 40 | 40 |
| θo-θi (deg.) | — | — | — | — | — | 50 | 50 |
| PResence or ABsence of reinforcing rubber layer | — | — | — | — | — | AB | AB |
| Lc (mm) | — | — | — | — | — | — | — |
| initial turning performance | 10 | 10 | 8 | 18 | 25 | 28 | 28 |
| middle turning performance | 10 | 10 | 8 | 10 | 10 | 15 | 15 |
| transient characteristics | 10 | 10 | 10 | 10 | 10 | 10 | 10 |
| ground contact feeling | 10 | 10 | 10 | 10 | 10 | 8 | 12 |

| Tire | Ex. 5 | Ex. 6 | Ex. 7 | Ex. 8 | Ex. 9 | Ex. 10 |
|---|---|---|---|---|---|---|
| Wa/TWe (%) | 47 | 47 | 53 | 47 | 47 | 47 |
| R1 (mm) | 58 | 58 | 58 | 58 | 58 | 58 |
| R2 (mm) | 67 | 67 | 67 | 67 | 67 | 67 |
| R2/R1 | 1.16 | 1.16 | 1.16 | 1.16 | 1.16 | 1.16 |
| La/TWe (%) | 1.5 | 1.5 | 6.5 | 1.5 | 1.5 | 1.5 |
| Wb/TWe (%) | 87 | 87 | 93 | 87 | 87 | 87 |
| Wc/TWe (%) | 97 | 97 | — | 97 | 97 | 97 |
| θo (deg.) | 90 | 90 | 90 | 70 | 80 | 90 |
| θi (deg.) | 70 | 70 | — | 40 | 80 | 70 |
| θo-θi (deg.) | 20 | 20 | — | 30 | 0 | 20 |
| PResence or ABsence of reinforcing rubber layer | AB | PR | — | AB | AB | PR |
| Lc (mm) | — | 1 | — | — | — | 4 |
| initial turning performance | 28 | 28 | 22 | 28 | 28 | 28 |
| middle turning performance | 15 | 18 | 10 | 10 | 10 | 18 |
| transient characteristics | 14 | 14 | 10 | 12 | 10 | 10 |
| ground contact feeling | 12 | 12 | 10 | 8 | 10 | 12 |

(*1)The axial ends of the were respectively located axially outward of the axial edges of the jointless band ply.

the radius R1 of curvature is less than the radius R2 of curvature, the radius R1 of curvature is less than 50% of the tire section width, in a normal state of the tire in which the tire is mounted on a regular rim and inflated to a normal tire pressure, axial ends of the crown arc portion are respectively located axially inward of axial edges of the jointless band ply.

Present Disclosure 2

The motorcycle tire according to Present Disclosure 1, wherein a ratio (R2/R1) between the radius R2 of curvature and the radius R1 of curvature is from 1.1 to 3.0.

Present Disclosure 3

The motorcycle tire according to Present Disclosure 1 or 2, wherein the crown arc portion is center on the tire equator and has a developed width of not less than 30% of a developed tread width.

Present Disclosure 4

The motorcycle tire according to Present Disclosure 1 or 2, wherein the jointless band ply is centered on the tire equator, and has a developed width of not less than 30% and less than 50% of a developed tread width.

Present Disclosure 5

The motorcycle tire according to Present Disclosure 1 or 2, wherein the tread reinforcement further includes a belt layer,
the belt layer comprises a plurality of belt plies made of parallel belt cords, and
each of the belt plies has a developed width greater than the developed width of the jointless band ply.

Present Disclosure 6

The motorcycle tire according to Present Disclosure 5, wherein the plurality of belt plies includes a radially outer belt ply disposed radially outside the jointless band ply, and a radially inner belt ply disposed radially inside the jointless band ply.

Present Disclosure 7

The motorcycle tire according to Present Disclosure 6, wherein the angle θo of the belt cords of the radially outer belt ply with respect to the tire equator is greater than the angle θi of the belt cords of the radially inner belt ply with respect to the tire equator.

Present Disclosure 8

The motorcycle tire according to Present Disclosure 7, wherein the difference (θo−θi) between the angle θo and the angle θi is 10 to 40 degrees.

Present Disclosure 9

The motorcycle tire according to Present Disclosure 7, wherein the angle θo is 70 to 90 degrees, and the angle θi is 50 to 80 degrees.

Present Disclosure 10

The motorcycle tire according to Present Disclosure 6, wherein, on each side in the tire axial direction, of the jointless band ply, a reinforcing rubber layer is disposed between the radially outer belt ply and the radially inner belt ply, and
a minimum distance between the radially outer belt ply and the radially inner belt ply between which the reinforcing rubber layer exists, is 0.5 to 3 mm.

DESCRIPTION OF THE REFERENCE SIGNS 1 motorcycle tire
2 tread portion
7 tread reinforcement
8A jointless band ply
8e axial edges of jointless band ply
P tread profile
Pc crown arc portion
Ps shoulder arc portion
P1 axial ends of crown arc portion
TWe developed tread width
Wt maximum cross section width of tire

The invention claimed is:
1. A motorcycle tire comprising:
a tread portion,
a toroidal carcass, and
a tread reinforcement disposed radially outside the carcass in the tread portion, wherein
the tread reinforcement includes a band layer and a belt layer,
the band layer is composed of a jointless band ply made of a band cord spirally wound at an angle of not more than 5 degrees with respect to the tire circumferential direction,
the jointless band ply is centered on the tire equator and has a developed width Wa of not more than 65% of a developed tread width,
the belt layer is composed of belt plies each made of parallel belt cords and centered on the tire equator,
the belt plies are a radially outer belt ply disposed radially outside the jointless band ply, and a radially inner belt ply disposed radially inside the jointless band ply,
the radially outer belt ply has a developed width Wb greater than the developed width of the jointless band ply,
the radially inner belt ply has a developed width Wc greater than the developed width of the radially outer belt ply,
between the radially outer belt ply and the radially inner belt ply, a reinforcing rubber layer is disposed on each side in the tire axial direction, of the jointless band ply so that edges in the tire axial direction of the radially outer belt ply are respectively positioned on radially outer sides of the respective reinforcing rubber layers, and a minimum distance between the radially outer belt ply and the radially inner belt ply between which the reinforcing rubber layer exists, is 0.5 to 3 mm, and
the reinforcing rubber layer is made up only of rubber having a complex elastic modulus E*1 in a range from 0.5 MPa to 3.0 MPa at a temperature of 70° C. and a frequency of 10 Hz.,
wherein
the tread portion has a tread profile comprising a pair of shoulder arcs portions having a radius R2 of curvature, and a crown arc portion having a radius R1 of curvature and extending between the shoulder arcs portions across the tire equator, the radius R1 of curvature is less than the radius R2 of curvature, the radius R1 of curvature is less than 50% of the tire section width, in a normal state of the tire in which the tire is mounted on a regular rim and inflated to a normal tire pressure, axial ends of the crown arc portion are respectively located axially inward of axial edges of the jointless band ply.

2. The motorcycle tire according to claim 1, wherein the jointless band ply has a developed width of not less than 30% and less than 50% of a developed tread width.

3. The motorcycle tire according to claim 1, wherein the crown arc portion is center on the tire equator and has a developed width of not less than 30% of a developed tread width.

4. The motorcycle tire according to claim 3, wherein a developed distance La between the adjacent axial end of the crown arc portion and axial edge of the jointless band ply is in a range from 2% to 10% of the developed tread width.

5. The motorcycle tire according to claim 1, wherein a ratio (R2/R1) between the radius R2 of curvature and the radius R1 of curvature is from 1.1 to 3.0.

6. The motorcycle tire according to claim 5, wherein the jointless band ply has a developed width of not less than 30% and less than 50% of a developed tread width.

7. The motorcycle tire according to claim 5, wherein the crown arc portion is center on the tire equator and has a developed width of not less than 30% of a developed tread width.

8. The motorcycle tire according to claim 7, wherein a developed distance La between the adjacent axial end of the crown arc portion and axial edge of the jointless band ply is in a range from 2% to 10% of the developed tread width.

9. The motorcycle tire according to claim 5, wherein an angle $\theta o$ of the belt cords of the radially outer belt ply with respect to the tire equator is greater than an angle $\theta i$ of the belt cords of the radially inner belt ply with respect to the tire equator.

10. The motorcycle tire according to claim 9, wherein the difference ($\theta o - \theta i$) between the angle $\theta o$ and the angle $\theta i$ is 10 to 40 degrees.

11. The motorcycle tire according to claim 9, wherein the angle $\theta o$ is 70 to 90 degrees, and the angle $\theta i$ is 50 to 80 degrees.

12. The motorcycle tire according to claim 11, wherein a developed distance Lb between axial edges of the radially outer belt ply and radially inner belt ply is in a range from 3% to 10% of the developed tread width.

13. The motorcycle tire according to claim 12, wherein a developed distance La between the adjacent axial end of the crown arc portion and axial edge of the jointless band ply is in a range from 2% to 10% of the developed tread width.

14. The motorcycle tire according to claim 1, wherein an angle $\theta o$ of the belt cords of the radially outer belt ply with respect to the tire equator is greater than an angle $\theta i$ of the belt cords of the radially inner belt ply with respect to the tire equator.

15. The motorcycle tire according to claim 14, wherein the difference ($\theta o - \theta i$) between the angle $\theta o$ and the angle $\theta i$ is 10 to 40 degrees.

16. The motorcycle tire according to claim 14, wherein the angle $\theta o$ is 70 to 90 degrees, and the angle $\theta i$ is 50 to 80 degrees.

17. The motorcycle tire according to claim 16, wherein a developed distance Lb between axial edges of the radially outer belt ply and radially inner belt ply is in a range from 3% to 10% of the developed tread width.

18. The motorcycle tire according to claim 17, wherein a developed distance La between the adjacent axial end of the crown arc portion and axial edge of the jointless band ply is in a range from 2% to 10% of the developed tread width.

* * * * *